(12) United States Patent
Horie et al.

(10) Patent No.: US 9,074,624 B2
(45) Date of Patent: Jul. 7, 2015

(54) LINEAR-RECIPROCATING DEVICE

(75) Inventors: Katsuyuki Horie, Tokyo (JP); Shinichi Saito, Tokyo (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 14/365,291

(22) PCT Filed: Jul. 13, 2012

(86) PCT No.: PCT/JP2012/067964
§ 371 (c)(1),
(2), (4) Date: Jun. 13, 2014

(87) PCT Pub. No.: WO2013/088769
PCT Pub. Date: Jun. 20, 2013

(65) Prior Publication Data
US 2014/0348448 A1 Nov. 27, 2014

(30) Foreign Application Priority Data

Dec. 16, 2011 (JP) ................................. 2011-275520

(51) Int. Cl.
*F16C 29/06* (2006.01)
*F16C 29/00* (2006.01)
(Continued)

(52) U.S. Cl.
CPC ............... *F16C 29/06* (2013.01); *F16C 29/007* (2013.01); *F16C 29/008* (2013.01); *F16C 29/02* (2013.01); *F16C 29/0602* (2013.01);
(Continued)

(58) Field of Classification Search
CPC .... F16C 29/005; F16C 29/007; F16C 29/008; F16C 29/06; F16C 29/043; F16C 29/045; F16C 29/0638; F16C 29/0685

USPC ............... 384/43–45, 49, 59; 74/89.31, 89.32
See application file for complete search history.

(56) References Cited

U.S. PATENT DOCUMENTS 4,296,974 A * 10/1981 Teramachi ...................... 384/45
4,527,842 A * 7/1985 Teramachi ...................... 384/45
(Continued)

FOREIGN PATENT DOCUMENTS

JP S59-166063 U 11/1984
JP H1-136716 U 9/1989
(Continued)

OTHER PUBLICATIONS

International search report corresponding to PCT/JP2012/067964 dated Oct. 1, 2012.

*Primary Examiner* — Marcus Charles
(74) *Attorney, Agent, or Firm* — McCormick, Paulding & Huber LLP

(57) ABSTRACT

A linear-reciprocating device 10 has a moving block 13 which is attached to a guide rail 12 provided to a support base 11 so as to freely reciprocate, ball rolling grooves 23*a* and 23*b* which form ball rolling paths 24*a* and 24*b* together with ball rolling grooves 21*a* and 21*b* are provided to a base end of the moving block 13, and ball circulation holes 25*a* and 25*b* which are communicated to the ball rolling paths 24*a* and 24*b* are provided to a base end. In a longitudinal-directional middle area of the moving block 13, return blocks 32*a* and 32*b* which communicate between the ball rolling paths 24*a* and 24*b* and the ball circulation holes 25*a* and 25*b* are provided. The moving block 13 moves to a position at which the moving block 13 is moved to a position at which the moving block is protruded from a distal end of the guide rail 12.

9 Claims, 11 Drawing Sheets

(51) Int. Cl.
*F16C 29/02* (2006.01)
*F16C 29/04* (2006.01)

(52) U.S. Cl.
CPC .......... *F16C 29/0685* (2013.01); *F16C 29/043* (2013.01); *F16C 29/045* (2013.01)

(56) References Cited

U.S. PATENT DOCUMENTS

| | | | |
|---|---|---|---|
| 5,011,300 A * | 4/1991 | Teramachi | 384/25 |
| 5,059,037 A * | 10/1991 | Albert | 384/45 |
| 5,360,271 A * | 11/1994 | Agari | 384/15 |
| 5,388,914 A * | 2/1995 | Takei | 384/45 |
| 5,501,528 A * | 3/1996 | Agari et al. | 384/45 |
| 6,116,783 A * | 9/2000 | Shirai et al. | 384/43 |
| 6,191,548 B1 * | 2/2001 | Kajita et al. | 318/568.18 |
| 6,309,107 B1 * | 10/2001 | Ueki et al. | 384/45 |
| 6,316,900 B2 * | 11/2001 | Kajita et al. | 318/568.18 |
| 6,558,038 B2 * | 5/2003 | Teramach et al. | 384/45 |
| 7,451,710 B2 * | 11/2008 | Arai | 108/20 |
| 7,520,191 B2 * | 4/2009 | Nagai et al. | 74/89.33 |
| 8,235,595 B2 * | 8/2012 | Schroeder | 384/55 |
| 2001/0022868 A1 | 9/2001 | Teramach et al. | |
| 2005/0169559 A1 * | 8/2005 | Mochizuki et al. | 384/15 |

FOREIGN PATENT DOCUMENTS

| | | |
|---|---|---|
| JP | H05-66329 U | 9/1993 |
| JP | 2002227839 A | 8/2002 |
| JP | 2007057104 A | 3/2007 |

* cited by examiner

LINEAR-RECIPROCATING DEVICE

TECHNICAL FIELD

The present invention relates to a linear-reciprocating device for linearly reciprocating a moving block along a guide rail so as to interpose a lot of balls between the moving block and the guide rail.

BACKGROUND ART

In order to linearly reciprocate an object to be transported such as a workpiece or a jig and a tool, a linear-reciprocating device is used so as to linearly reciprocate a moving block such as a slider or a table, to which the object to be transported is attached, along a guide rail of a support base. The support base is provided with a drive rod that reciprocates freely in a longitudinal direction of the support base, a protruding end of the drive rod is connected to a distal end of a moving member by a connection block, and the moving member is linearly reciprocated by the reciprocation of the drive rod. The drive rod is driven by a driving source such as a pneumatic cylinder or an electric motor.

By attaching the moving block to the guide rail via balls so as to interpose a lot of balls between the moving block and the guide rail, the moving block which reciprocates along the guide rail can be driven with a small rolling resistance. A lot of balls are housed inside a ball rolling path which is formed of a rolling groove having an almost semicircular shape and being provided to the moving block and a rolling groove having an almost semicircular shape and being provided to the guide rail, and the balls are moved while rolling inside the ball rolling path when the moving block is driven.

The following two types are known as such a ball slider that the moving block is attached to the guide rail via the balls. One of them is an infinite guide type provided with a return hole, that is, a ball circulation hole provided separately from the ball rolling path for circulating the balls between the ball circulation hole and the ball rolling path. The other is a finite guide type in which the balls are not circulated. Patent Document 1 describes the infinite guide type ball slider.

PRIOR ART DOCUMENT

Patent Document

Patent Document 1: Japanese Patent Application Laid-Open Publication No. 2007-57104

DISCLOSURE OF THE INVENTION

Problems to be Solved by the Invention

In a conventional infinite guide type ball slider, return lid members which communicate between the ball rolling path and the ball circulation hole are provided to both ends of the moving block. Therefore, when the moving block is moved to a position at which the moving block is protruded from an end of the guide rail, the balls fall out of the ball rolling groove, and therefore, the moving block cannot be driven to a position at which an end of the moving block is protruded from the guide rail.

For example, in a linear-reciprocating device of such a type that the driving source for driving the moving block is housed in the support base provided with the guide rail, the moving block is protruded from a distal end of the support base or guide rail when the drive rod driven by the driving source so as to be protruded from the support base is connected to the moving block. Practically, such a protruding structure is impossible, and therefore, the following structure is practically adopted. It is required to protrude a drive member reciprocated by the driving source inside the support base from a slit formed on the guide rail so that a slider or the drive member is engaged with an inner surface of the moving block, and therefore, the structure of the guide rail is complicated. If the structures of the guide rail and the slider are complicated, their heights are increased, and therefore, the linear-reciprocating device cannot be downsized.

A preferred aim of the present invention is to achieve the downsizing of the linear-reciprocating device.

Means for Solving the Problems

A linear-reciprocating device of the present invention has a feature of a linear-reciprocating device for linearly reciprocating a moving block attached to a guide rail provided to a support base so as to freely reciprocate, and the linear-reciprocating device includes: a first ball rolling groove formed on a side surface of the guide rail so as to face a side surface of a guide groove which is formed on an inner surface of the moving block and into which the guide rail is inserted; a second ball rolling groove formed on a base end side of the guide groove and forming a ball rolling path together with the first ball rolling groove; a lot of balls housed in the ball rolling path and in a ball circulation hole formed along the ball rolling path; a return lid member provided to a base end of the moving block to form a base-end-side ball return path for communication between the ball rolling path and the ball circulation hole; and a return block provided to a longitudinal-directional middle area of the moving block to form a middle-side ball return path for communication between the ball rolling path and the ball circulation hole. In the linear-reciprocating device, the moving block is guided by the balls to a position at which a distal end of the moving block is protruded from a distal end of the guide rail.

The linear-reciprocating device of the present invention has such a feature that an attachment concave portion to which the return block is attached is formed in a longitudinal-directional middle area of an inner surface of the moving block. The linear-reciprocating device of the present invention has such a feature that an abutment surface on which the return block is abutted is formed in a longitudinal-directional middle area of an inner surface of the moving block. The linear-reciprocating device of the present invention has such a feature that the first ball rolling groove is provided to both sides of the guide rail, and that the second ball rolling groove is provided to both side surfaces of the guide groove of the moving block. The linear-reciprocating device of the present invention has such a feature that the two return lid members provided to both sides of the moving block are integrally formed with each other by a connecting portion.

The linear-reciprocating device of the present invention has such a feature that the two return blocks provided to both sides of the moving block are integrally formed with each other by a connecting portion. The linear-reciprocating device of the present invention has such a feature that the ball circulation hole is formed at a horizontal position along a surface of the guide rail with respect to the ball rolling path. The linear-reciprocating device of the present invention has such a feature that a guide fit hole in which a return groove is formed on each of the return lid member and the return block is provided, and that a return groove for forming the ball return path together with the above-described return groove is provided to a return guide fitted into the guide fit hole. The linear-reciprocating device of the present invention has such a feature that the return guides attached to the return lid member and the return block are formed in the same shape as each other. The linear-reciprocating device of the present invention has such a feature that a drive rod provided to the support base is connected to a distal end of the moving block, and that the moving block is reciprocated by the drive rod protruded from a distal end surface of the support base.

Effects of the Invention

In a linear-reciprocating device of the present invention, a ball rolling path is formed of a first ball rolling groove provided to a guide rail and a second ball rolling groove provided on a base end side of a moving block. A ball circulation hole which is communicated into the ball rolling path is provided to the base end. A middle-side ball return path which communicates between the ball rolling path and the ball circulation hole is provided in a longitudinal-directional middle area of the moving block. Therefore, the moving block can be moved to a position at which the moving block is protruded while rolling balls from a distal end of the guide rail.

Since the moving block can be moved to the position at which the moving block is protruded from the distal end of the guide rail, a drive rod for driving the moving block can be provided to a support base, and the drive rod can be connected to a distal end of the moving block. In this manner, in comparison with a case that the drive source and the moving block are connected to each other inside the support base, a structure of the linear-reciprocating device is not complicated, and the linear-reciprocating device can be downsized by forming a thickness of the structure to be thin. Since the guide rail is provided to the support base, the drive source for driving the drive rod can be protruded into the guide rail so as to downsize the linear-reciprocating device including the guide rail and the support base.

BRIEF DESCRIPTIONS OF THE DRAWINGS

BEST MODE FOR CARRYING OUT THE INVENTION

Figure 1A:
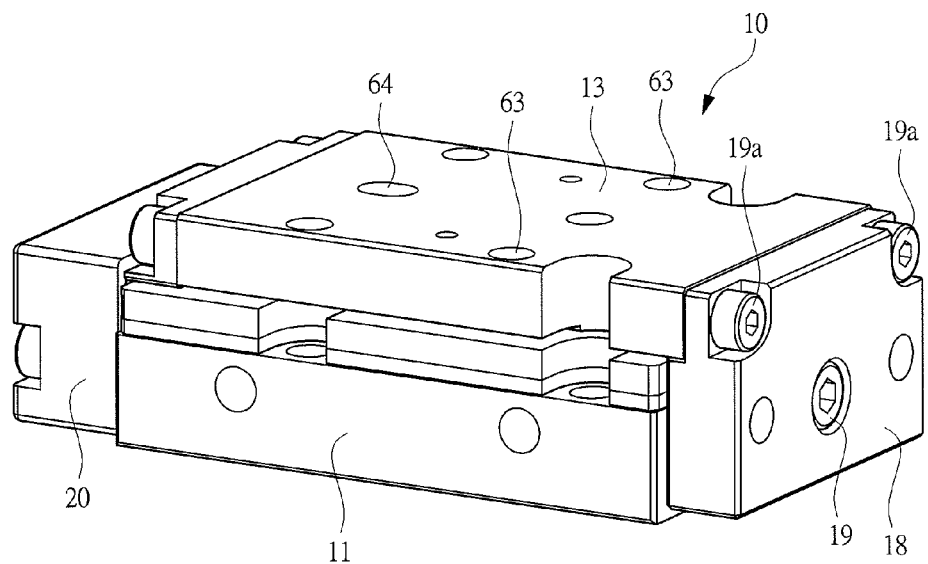
FIG. 1A is a perspective view of a linear-reciprocating device as viewed from above in a state that a moving block moves backward.
Figure 1B:
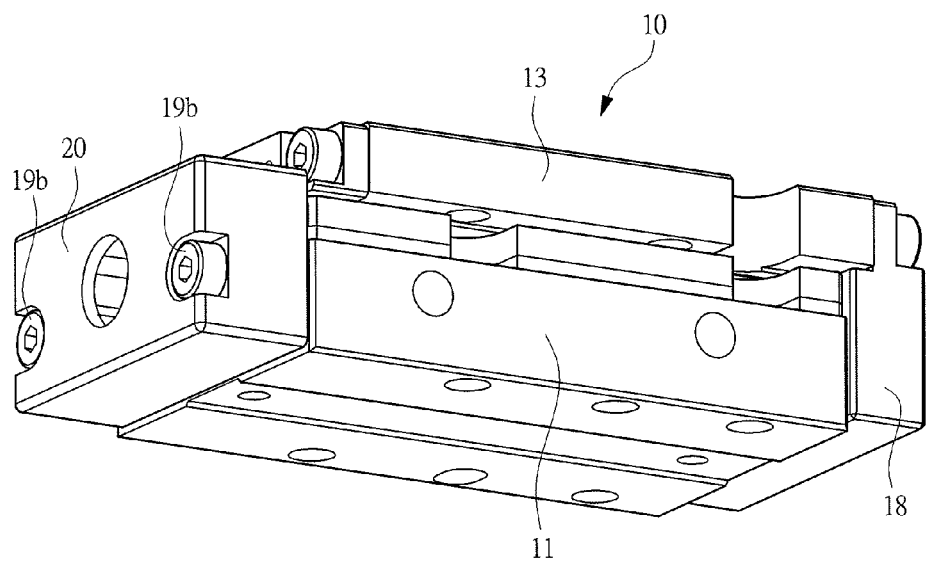
FIG. 1B is a perspective view of the linear-reciprocating device illustrated in FIG. 1A as viewed from below.
Figure 2A:
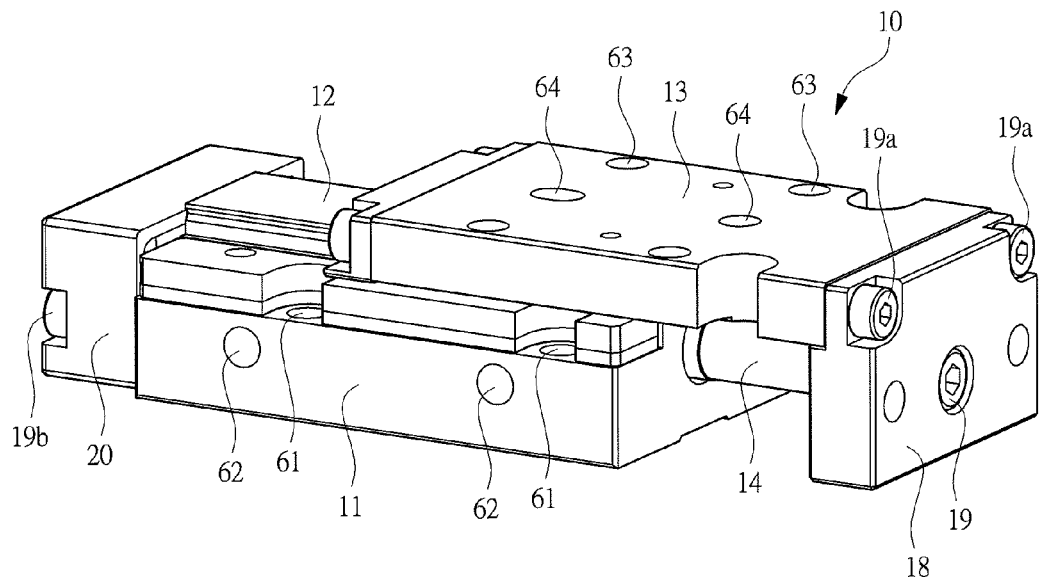
FIG. 2A is a perspective view of a linear-reciprocating device as viewed from above in a state that a moving block moves forward.
Figure 2B:
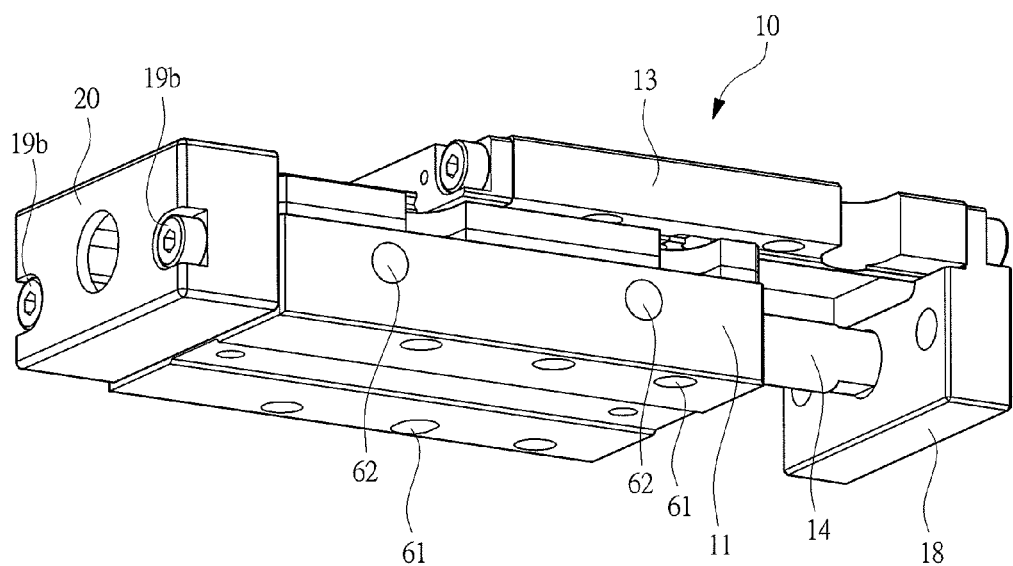
FIG. 2B is a perspective view of the linear-reciprocating device illustrated in FIG. 2A as viewed from below.
Figure 4:
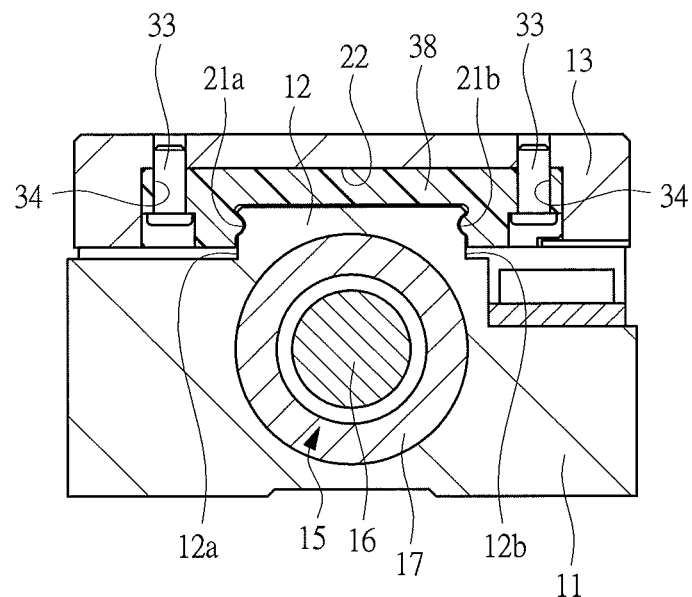
FIG. 4 is a cross-sectional view taken along a line 4-4 in FIG. 3.
Figure 5:
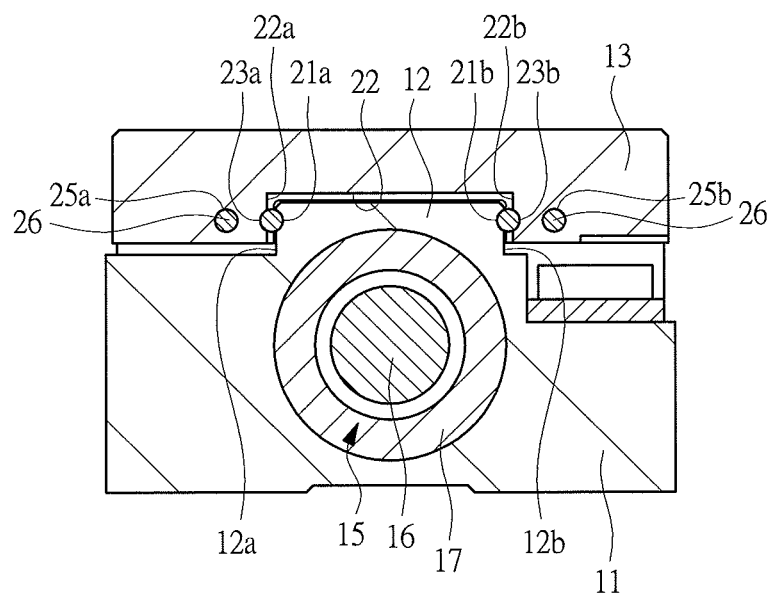
FIG. 5 is a cross-sectional view taken along a line 5-5 in FIG. 3.

Hereinafter, an embodiment of the present invention will be described in detail based on drawings. As illustrated in FIGS. 1 and 2, a linear-reciprocating device 10 includes a support base 11. As illustrated in FIGS. 4 and 5, in the drawing, a guide rail 12 is formed in a width-directional middle area of an upper surface of the support base 11 so as to protrude upward and extend in the longitudinal direction. A moving table, that is, a moving block 13 is attached along the guide rail 12 so as to freely linearly reciprocate. In order to drive the moving block 13, a driving source is housed inside the support base 11. A drive rod 14 driven by the driving source is protruded from a distal end of the support base 11 as illustrated in FIG. 2A. A linear motor 15 having the drive rod 14 as a movable member is used as the driving source, and the linear motor 15 has a magnet 16 attached to the drive rod 14 and a coil 17 that is housed inside the support base 11 so as to surround the magnet 16 as illustrated in FIGS. 4 and 5.

A connection block 18 is fixed to the distal end of the drive rod 14 by a screw member 19, and the connection block 18 is also fixed to a distal end of the moving block 13 by a screw member 19a. The drive rod 14 is connected to the distal end of the moving block 13, that is, one end thereof, and the other end opposite to the distal end serves as a base end. An electric power supply block 20 is attached to a base end surface of the support base 11 by a screw member 19b, and a non-illustrated signal cable for supplying a drive signal to the coil 17 of the linear motor is connected to the electric power supply block 20.

Figure 3:
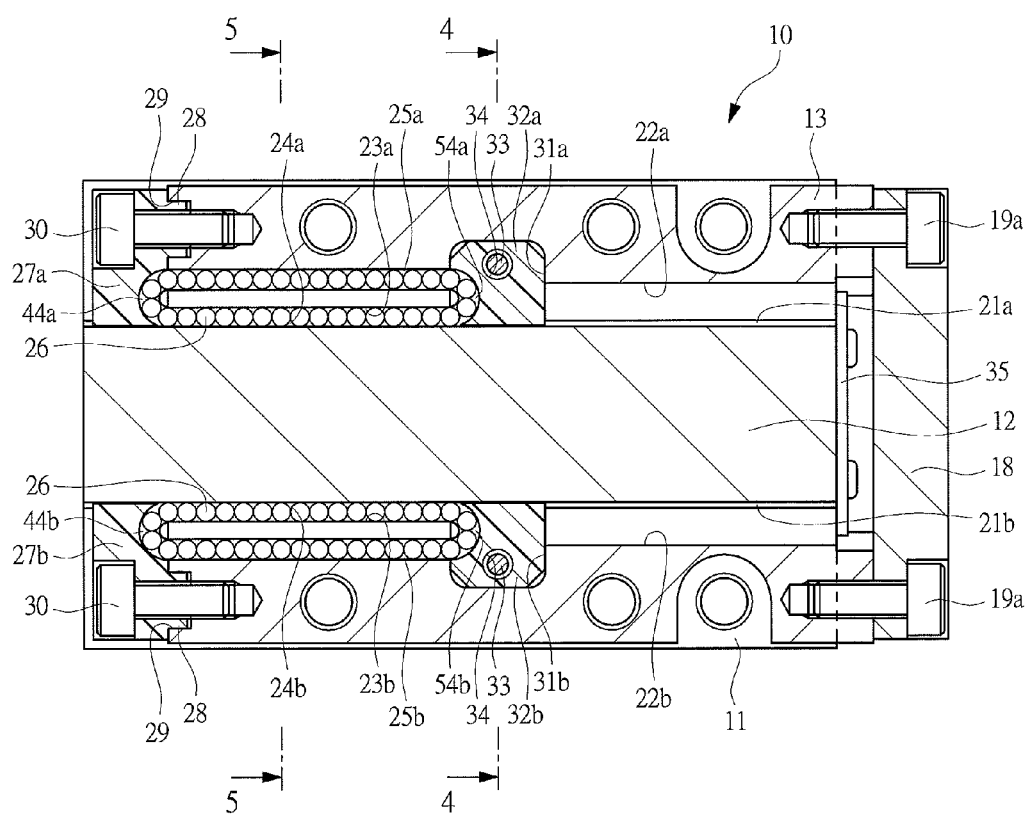
FIG. 3 is a cross-sectional view of FIG. 1A.
Figure 6:
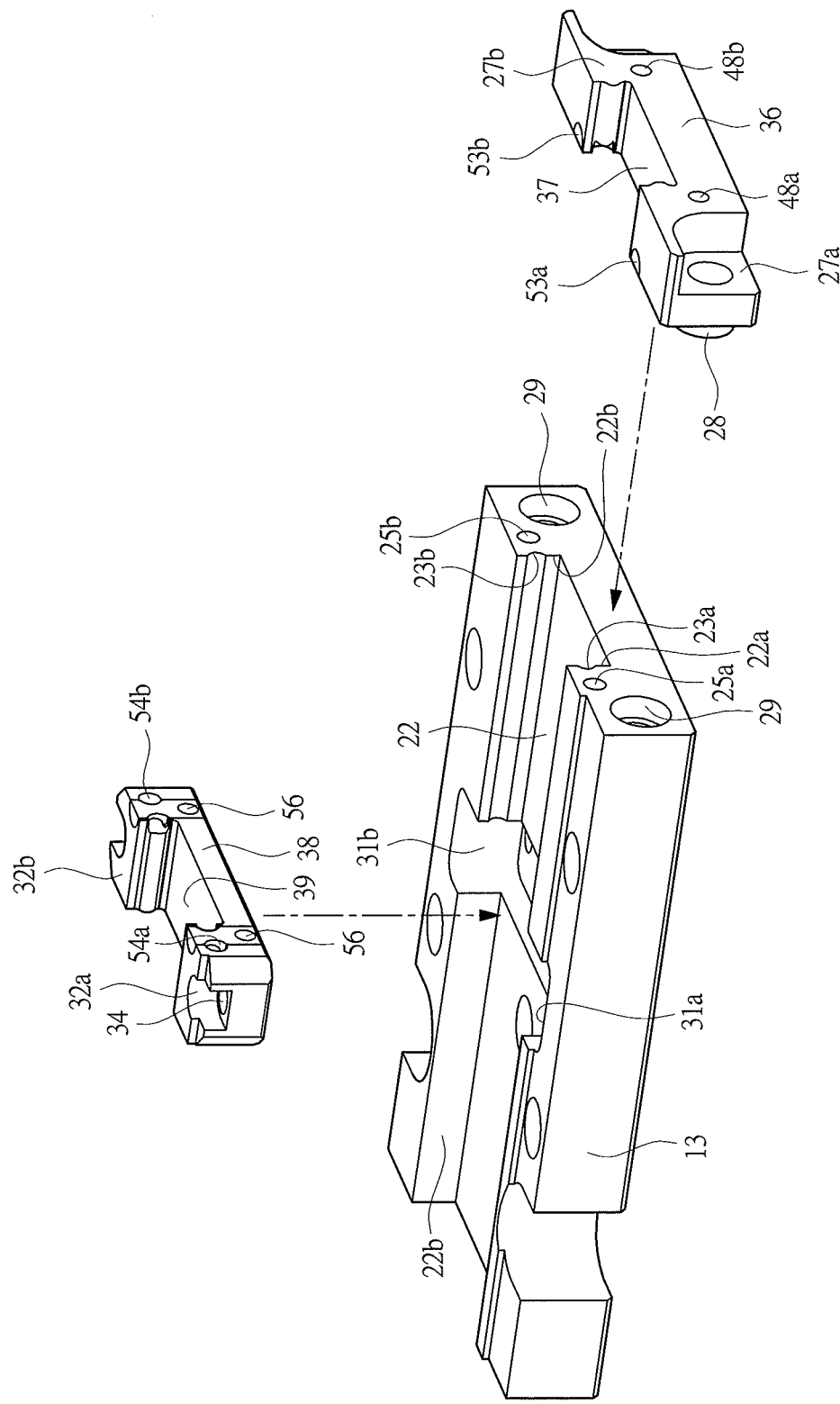
FIG. 6 is an exploded perspective view of a return lid member, a return block, and inner surfaces of the moving block from which the return lid member and the return block are detached, as viewed from above.

As illustrated in FIGS. 3 to 5, ball rolling grooves 21a and 21b each of which has an almost semi-circular cross-sectional shape are provided on both side surfaces 12a and 12b of the guide rail 12 over the whole length of the guide rail 12 as a first rolling groove. As illustrated in FIG. 6, a guide groove 22 to which the guide rail 12 is inserted is provided to the width-directional middle area of an inner surface of the moving block 13 over the whole length. When the moving block 13 is attached to the support base 11, the guide rail 12 is inserted into the guide groove 22 so that the both side surfaces 12a and 12b of the guide rail 12 face both side surfaces 22a and 22b of the guide groove 22, respectively.

On an inner side surface of the guide groove 22 at the base end of the moving block 13, ball rolling grooves 23a and 23b each of which has an almost semi-circular cross-sectional shape are provided as a second rolling groove. A ball rolling path 24a is formed of the ball rolling grooves 21a and 23a facing each other, and a ball rolling path 24b is formed of the ball rolling grooves 21b and 23b facing each other.

Return holes, that is, ball circulation holes 25a and 25b are formed on the base end of the moving block 13, and the ball circulation holes 25a and 25b are in parallel with the ball rolling paths 24a and 24b, respectively. A looped infinite circulation path is formed of a pair of the ball rolling path 24a and the ball circulation hole 25a, and a circulation path is similarly formed of a pair of the ball rolling path 24b and the ball circulation hole 25b. A lot of balls 26 are housed in each circulation path. The ball circulation holes 25a and 25b are formed in parallel with the ball rolling paths 24a and 24b on a horizontal plane along the surface of the guide rail 12, respectively.

By providing the guide rail 12 integrally on the support base 11 and providing the guide groove 22 into which the guide rail 12 is inserted on the inner surface of the moving block 13, the moving block 13 is attached to the guide rail 12 so as to straddle the guide rail 12. The ball circulation holes 25a and 25b are formed in parallel with the ball rolling paths 24a and 24b on the horizontal plane along the surface of the guide rail 12, respectively. In addition, as illustrated in FIGS. 4 and 5, the linear motor 15 is housed so as to protrude from the support base 11 into the guide rail 12. In this manner, a total thickness of the support base 11 and the moving block 13 can be reduced, so that a height of the linear-reciprocating device 10 in an up-and-down direction in FIGS. 4 and 5 can be reduced.

As illustrated in FIG. 3, to the base end surface of the moving block 13, a return lid member 27a that communicates between the ball rolling path 24a and the ball circulation hole 25a and a return lid member 27b that communicates between the ball rolling path 24b and the ball circulation hole 25b are attached. On the base end side of the moving block 13, the return lid member 27a communicates between the ball rolling path 24a and the ball circulation hole 25a, and the return lid member 27b communicates between the ball rolling path 24b and the ball circulation hole 25b. As illustrated in FIG. 3, a circular protrusion 28 is provided to abutment surfaces of the return lid members 27a and 27b, respectively, and a fit hole 29 with which the protrusion 28 is fitted is provided to the base end surface of the moving block 13. Each of the return lid members 27a and 27b is fastened to the moving block 13 by a screw member 30 screwed with a female screw that is provided to the moving block 13 so as to be coaxial with the fit hole 29.

Attachment concave portions 31a and 31b are provided to the inner surface of the moving block 13 so as to be positioned in a longitudinal-directional middle area. To the attachment concave portions 31a and 31b, the return blocks 32a and 32b are provided, respectively. The return block 32a communicates between the ball rolling path 24a and the ball circulation hole 25a in the longitudinal-directional middle area of the moving block 13, and the return block 32b communicates between the ball rolling path 24b and the ball circulation hole 25b in the longitudinal-directional middle area of the moving block 13. In order to fix each of the return blocks 32b and 32b to the moving block 13, a screw member 33 screwed into a screw hole formed on the moving block 13 is attached to an attachment hole 34 provided to the return blocks 32b and 32b.

When the moving block 13 linearly reciprocates, the moving block 13 moves along the guide rail 12 via a lot of balls 26, and therefore, a rolling resistance applied to the moving block 13 is reduced, and the moving block 13 can be reciprocated smoothly with a small power. When the moving block 13 is driven, the balls 26 are circulated inside the looped continuous circulation path. The ball rolling paths 24a and 24b are provided on the base end side of the moving block 13, and the balls 26 do not fall off the inside of the circulation path even if the distal end of the moving block 13 protrudes from the distal end of the guide rail 12 as illustrated in FIG. 2.

In this manner, even if the moving block 13 moves to a position at which the moving block 13 protrudes from the guide rail 12 of the support base 11, the balls 26 can be interposed between the moving block 13 and the guide rail 12. That is, even if the drive rod 14 protruding from the distal end surface of the support base 11 is connected to the distal end of the moving block 13, the moving block 13 can be driven by the drive rod 14. In order to restrict a moving-forward limitation position of the moving block 13, a stopper 35 is attached to the distal end surface of the support base 11 as illustrated in FIG. 3.

While each of the support base 11 and the moving block 13 is made of a metal material, each of the return lid members 27a and 27b and the return blocks 32a and 32b is made of a resin material. As illustrated in FIG. 6, the return lid members 27a and 27b are provided integrally to both ends of a first connecting portion 36 so as to protrude from the first connecting portion 36. A guide groove 37 into which the guide rail 12 is inserted is formed of the return lid members 27a and 27b and the first connecting portion 36. Similarly, the return blocks 32a and 32b are provided integrally to both ends of a second connecting portion 38 so as to protrude from the second connecting portion 38. A guide groove 39 into which the guide rail 12 is inserted is formed of the return blocks 32a and 32b and the second connecting portion 38. On the inner surface of the moving block 13, an attachment groove to which the second connecting portion 38 is attached is provided so as to be continuous from the attachment concave portions 31a and 31b.

Figure 8:
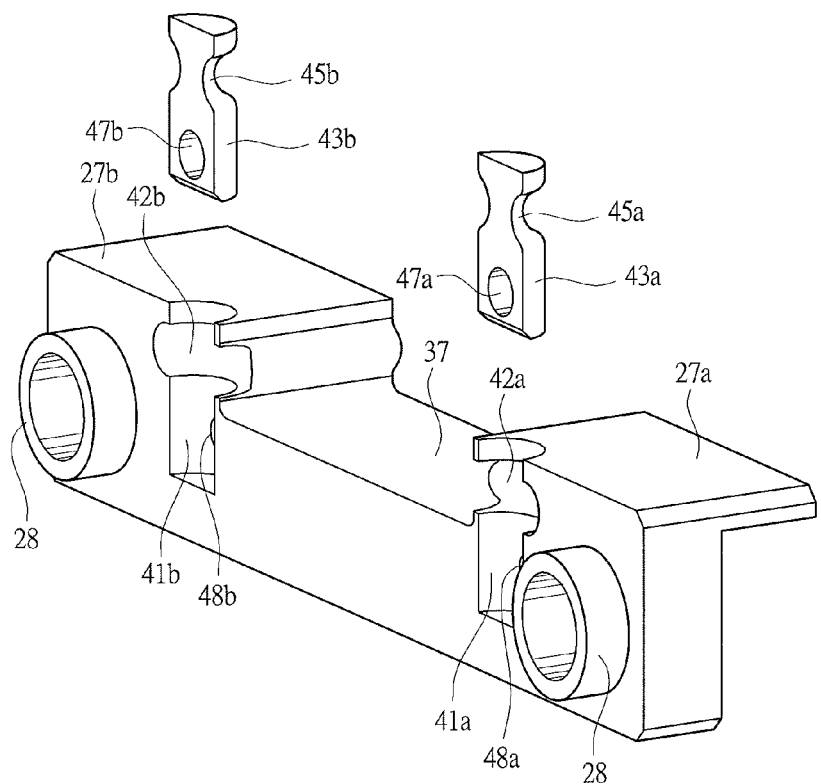
FIG. 8 is an exploded perspective view of a return guide and the return lid member from which the return guide is detached.

As illustrated in FIG. 8, guide fit holes 41a and 41b each having a semi-circular cross-sectional surface are formed on the return lid members 27a and 27b, and first return grooves 42a and 42b opened to the guide fit holes 41a and 41 b are also formed on the return lid members 27a and 27b, respectively. Each of the first return grooves 42a and 42b has an almost semi-circular cross-sectional surface, and extends in the longitudinal direction as a semi-circular shape. Each of return guides 43a and 43b each of which has an almost semi-circular cross-sectional surface is fitted to the guide fit holes 41a and 41b, and the return guides 43a and 43b are provided with second return grooves 45a and 45b which form base-end-side ball return paths 44a and 44b together with the return grooves 42a and 42b, respectively. As similar to the return grooves 42a and 42b, each of the second return grooves 45a and 45b has an almost semi-circular cross-sectional surface, and extends in the longitudinal direction as a semi-circular shape.

In order to fix the return guides 43a and 43b to the return lid members 27a and 27b, attachment holes 47a and 47b to which pins 46 are attached are provided to the return guides 43a and 43b, and fit holes 48a and 48b to which the pins 46 are attached are provided ti the return lid members 27a and 27b as illustrated in FIG. 6, respectively.

Figure 10:
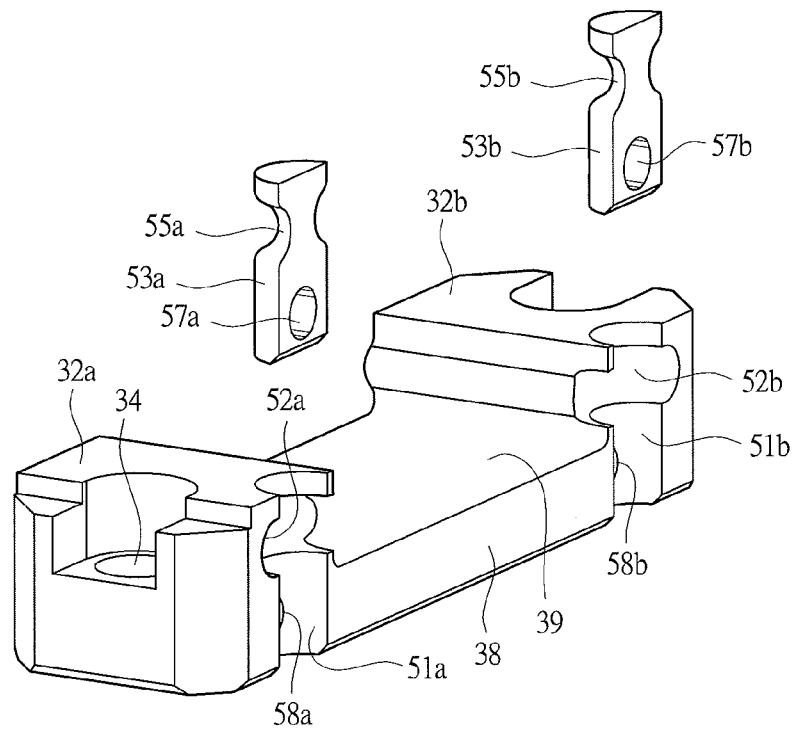
FIG. 10 is an exploded perspective view of the return guide and the return block from which the return guide is detached.

Similarly as illustrated in FIG. 10, guide fit holes 51a and 51b each of which has a semi-circular cross-sectional surface are formed on the return blocks 32a and 32b, and return grooves 52a and 52b opened to the guide fit holes 51a and 51 b are also provided to the return blocks 32a and 32b, respectively. Each of the return grooves 52a and 52b has an almost semi-circular cross-sectional surface, and extends in the longitudinal direction as a semi-circular shape. Return guides 53a and 53b each having an almost semi-circular cross-sectional surface are fitted to the guide fit holes 51a and 51b, and return grooves 55a and 55b for forming middle-side ball return paths 54a and 54b together with the return grooves 52a and 52b are provided to the return guides 53a and 53b, respectively. As similar to the return grooves 52a and 52b, each of the return grooves 55a and 55b has an almost semi-circular cross-sectional surface, and extends in the longitudinal direction as a semi-circular shape.

In order to fix the return guides 53a and 53b to the return blocks 32a and 32b, respectively, attachment holes 57a and 57b to which a pin 56 is attached are provided to the return guides 53a and 53b, and, fit holes 58a and 58b to which the pin 56 is attached are provided to the return blocks 32a and 32b as illustrated in FIG. 10, respectively.

The return guides 43a and 43b are fixed to the return lid members 27a and 27b by using the pin 46. However, the return guides 43a and 43b may be fixed to the return lid members 27a and 27b by using a snap fit manner, welding, or bonding, or may be fixed to the guide fit holes 41a and 41b by using a press fit manner. As similar to the return guides 43a and 43b, the return guides 53a and 53b may be fixed to the return blocks 32a and 32b.

As illustrated in FIGS. 1 and 2, a plurality of screw holes 61 are provided outside the guide rail 12 in a width direction, the screw holes 61 each being screwed with a screw member for fixing the support base 11 to a not-illustrated board, and screw holes 62 are also provided on both left and right side surfaces. A plurality of screw holes 63 and a plurality of positioning holes 64 are provided to the moving block 13, the screw holes 63 to which a member to be transported such as a jig and tool arranged on an outer surface of the moving block 13 is attached, and the positioning holes 64 which positions the member to be transported.

To one linear-reciprocating device 10, four return guides 43a, 43b, 53a, and 53b are attached. These return guides have the same shape as each other, so that any return guide can be mounted on the return lid members 27a and 27b and the return blocks 32a and 32b. In this manner, components can be easily managed in the assembly of the linear-reciprocating device 10.

As described above, since two return lid members 27a and 27b are connected integrally to each other by the first connecting portion 36, both return lid members 27a and 27b can be simultaneously attached to the moving block 13 by one attachment operation. Similarly, since two return blocks 32a and 32b are connected integrally to each other by the second connecting portion 38, both return blocks 32a and 32b can be simultaneously attached to the moving block 13 by one attachment operation. If the return lid members 27a and 27b are separation forms, each of them is separately attached to the moving block 13. Similarly, if the return blocks 32a and 32b are separation forms, each of them is separately attached to the moving block 13.

Figure 11:
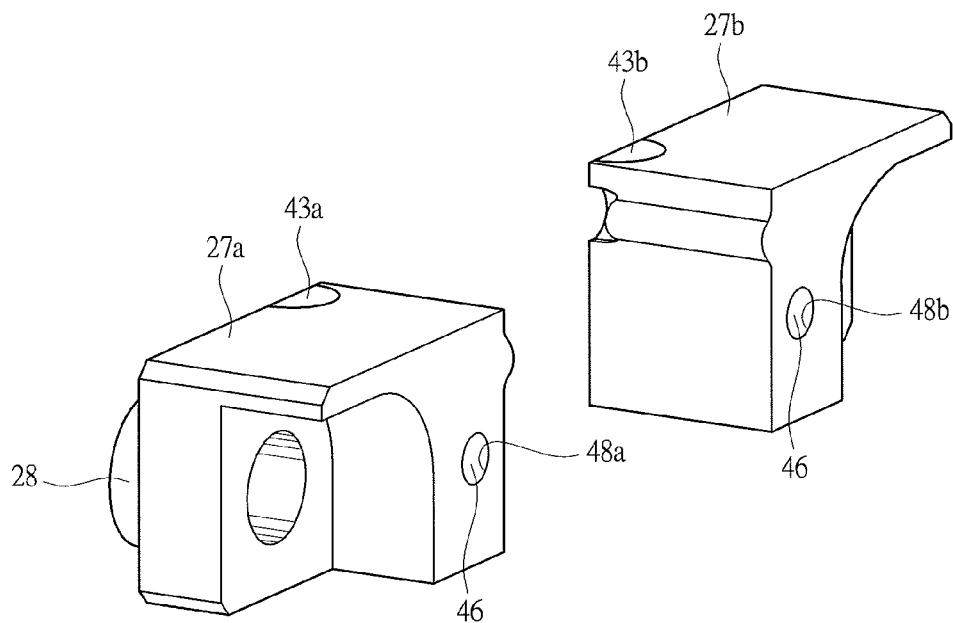
FIG. 11 is a perspective view illustrating a modification example of the return lid member.
Figure 12:
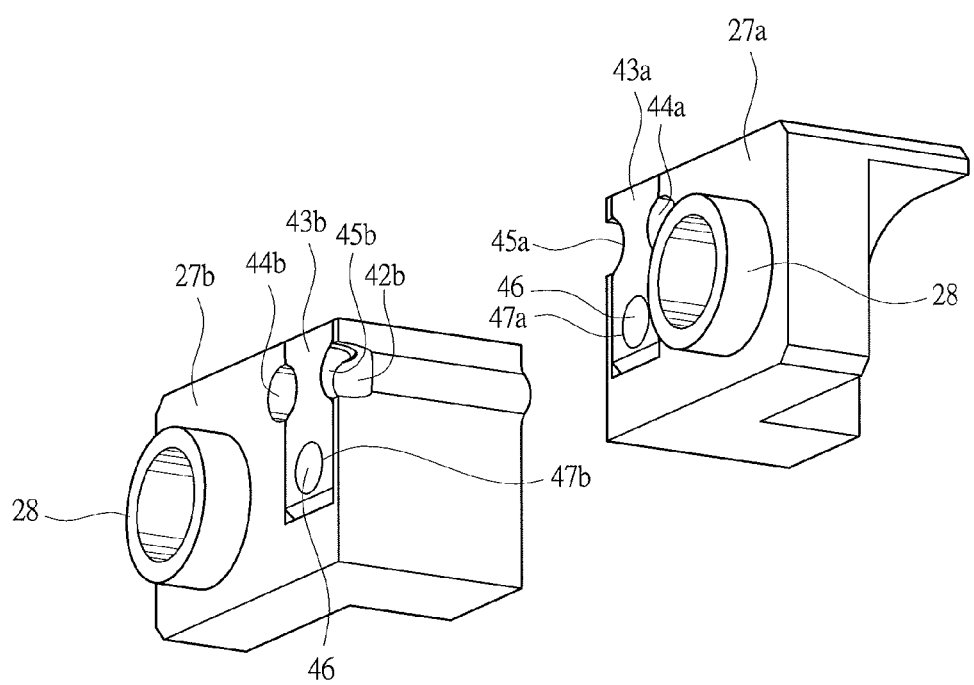
FIG. 12 is a perspective view of the return lid member illustrated in FIG. 11 as view from an opposite side.
Figure 13:
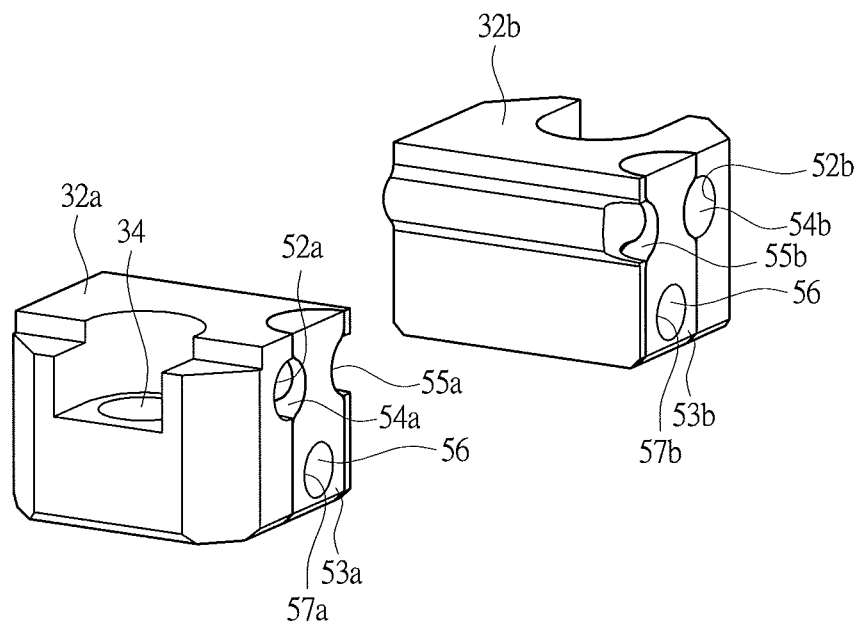
FIG. 13 is a perspective view illustrating a modification example of the return block.
Figure 14:
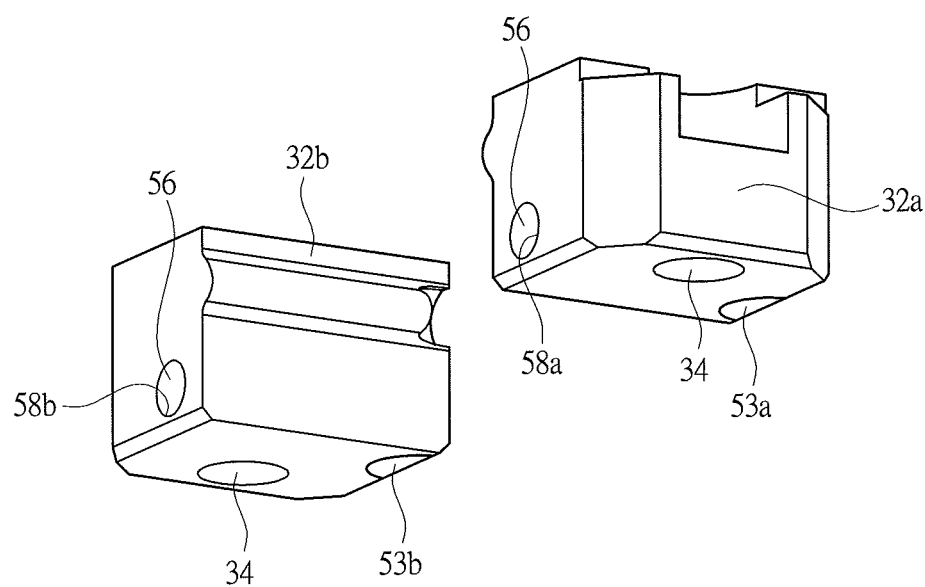
FIG. 14 is a perspective view of the return block illustrated in FIG. 13 as view from an opposite side.

FIG. 11 is a perspective view illustrating the return lid members 27a and 27b as a modification example, FIG. 12 is a perspective view of the return lid members of FIG. 11 as viewed from an opposite side, FIG. 13 is a perspective view of the return blocks 32a and 32b as a modification example, and FIG. 14 is a perspective view of the return blocks of FIG. 13 as viewed from an opposite side. In these drawings, common components with the above-described components are denoted by the same reference symbols.

The return lid members 27a and 27b illustrated in FIGS. 11 and 12 are separation forms, and therefore, each of them is separately attached to the moving block 13. Similarly, the return blocks 32a and 32b illustrated in FIGS. 13 and 14 are also separation forms, and therefore, each of them is separately attached to the moving block 13.

Figure 7:
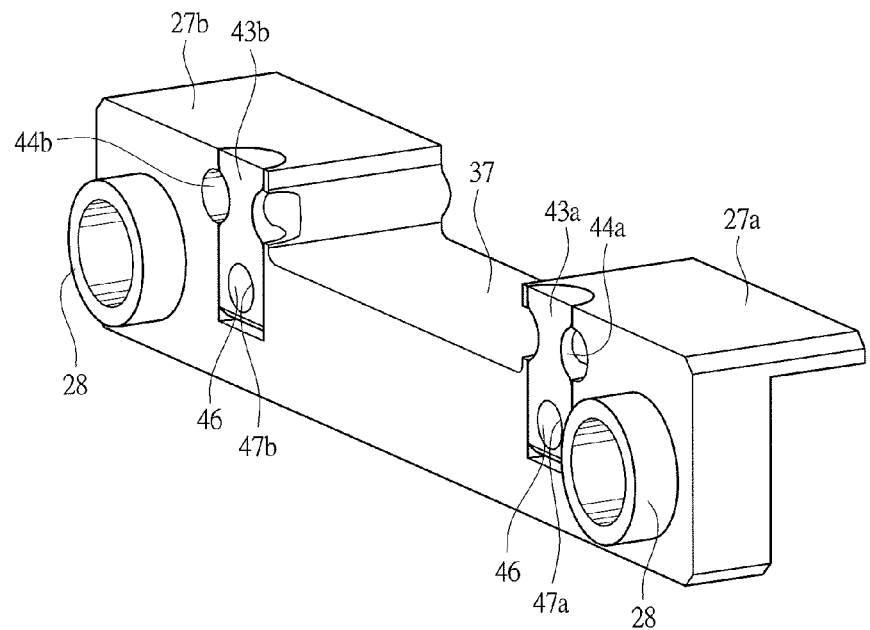
FIG. 7 is an enlarged perspective view of the return lid member illustrated in FIG. 6.
Figure 9:
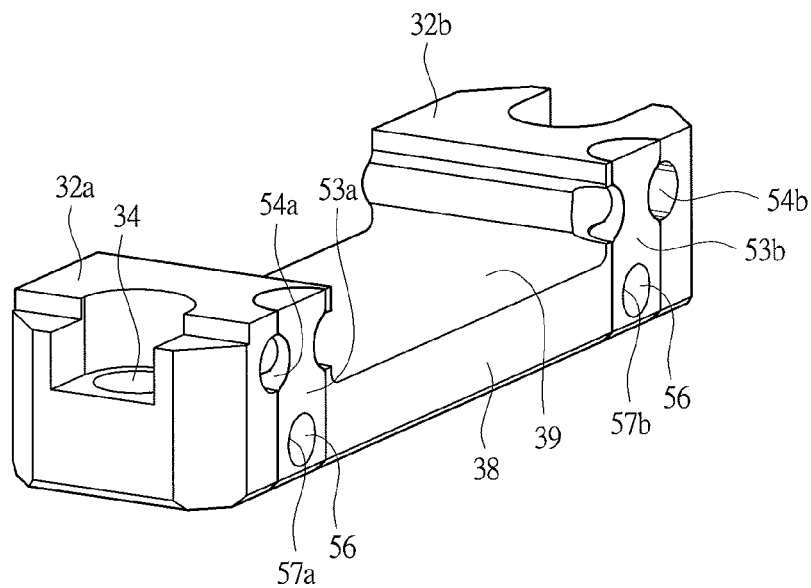
FIG. 9 is an enlarged perspective view of the return block illustrated in FIG. 6.
Figure 15:
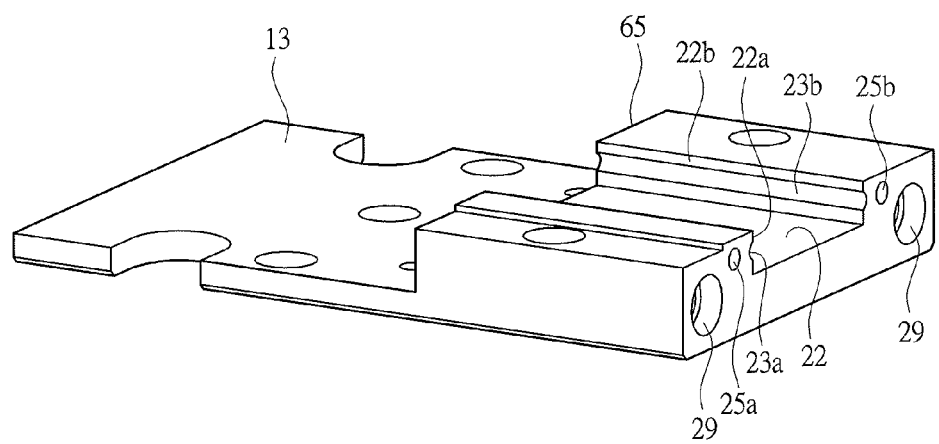
FIG. 15 is a perspective view illustrating a modification example of the moving block.

FIG. 15 is a perspective view illustrating a modification example of the moving block 13. Although the guide groove 22 is provided to this moving block 13 on a base end side, and the guide groove 22 is not provided thereto on a distal end side. The return lid members 27a and 27b illustrated in FIG. 7 or 11 are attached to the base end surface of the moving block 13, and the return blocks 32a and 32b illustrated in FIG. 9 or 13 are attached to the moving block 13 so as to be abutted onto an abutment surface 65 provided in a longitudinal-directional middle area of the moving block 13.

Figure 16:
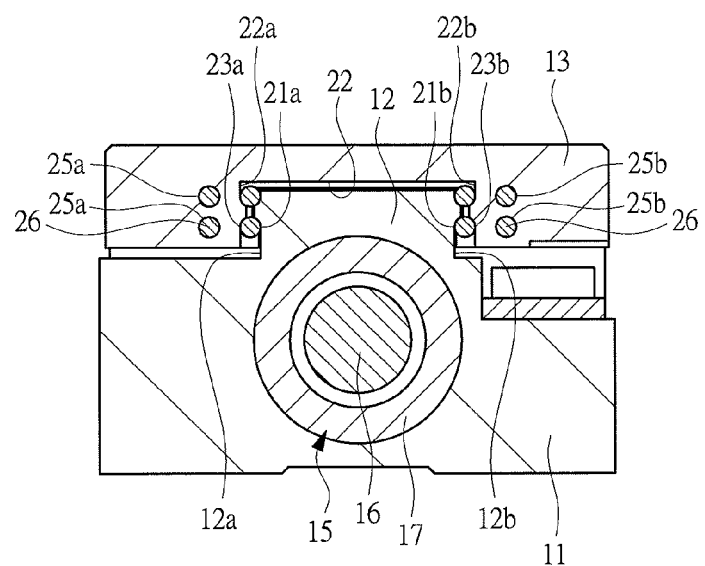
FIG. 16 is a cross-sectional view illustrating a modification example of the linear-reciprocating device.

FIG. 16 is a cross-sectional view illustrating a modification example of the linear-reciprocating device 10, and FIG. 16 illustrates the same part as FIG. 15.

As illustrated in FIG. 16, in this linear-reciprocating device 10, two ball rolling grooves 21a and 21a are provided to a side surface 12a of the guide rail 12 so as to vertically interpose a gap therebetween, and two ball rolling grooves 21b and 21b are provided to a side surface 12b of the guide rail 12 so as to vertically interpose a gap therebetween. Two vertically-arranged ball rolling grooves 23a and 23a are provided to a side surface 22a of the guide groove 22 so as to face the two ball rolling grooves 21a and 21a, and two vertically-arranged ball rolling grooves 23b and 23b are provided to a side surface 22b of the guide groove 22 so as to face the two ball rolling grooves 21b and 21b.

Figure 17:
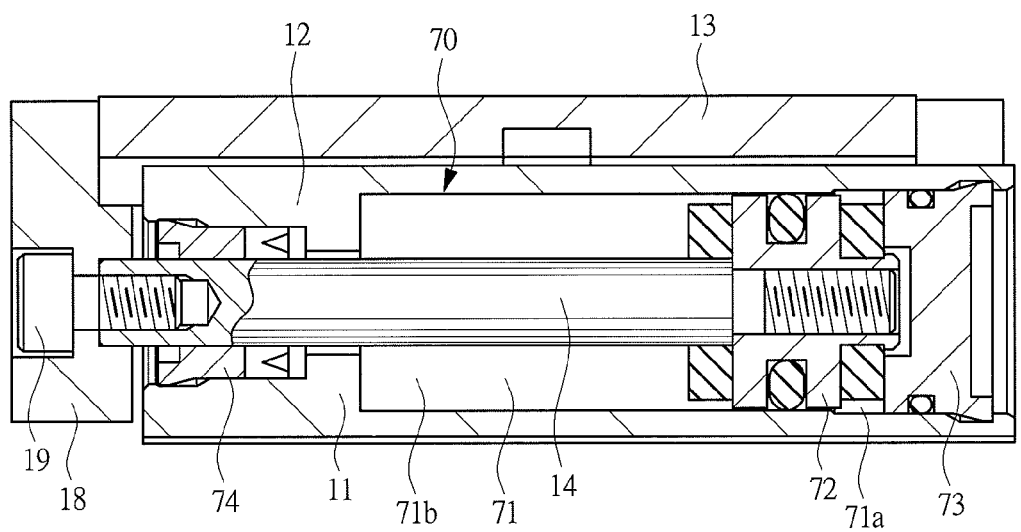
FIG. 17 is a cross-sectional view illustrating a modification example of a driving source of the linear-reciprocating device.

FIG. 17 is a cross-sectional view illustrating a modification example of the driving source of the linear-reciprocating device 10. While the linear motor 15 is housed as the driving source inside the support base 11 in the above-described linear-reciprocating device 10, a pneumatic cylinder 70 is housed as the driving source inside the support base 11 in the linear-reciprocating device 10 illustrated in FIG. 17.

A cylinder hole 71 is provided into the support base 11, and a piston 72 is attached to the base end of the drive rod 14. A cover 73 is attached to the base end of the support base 11, and a cover 74 thorough which the drive rod 14 penetrates is attached to the distal end of the support base 11. The cylinder hole 71 is partitioned by the piston 72 into a pneumatic chamber 71a for moving the rod forward and a pneumatic chamber 71b for moving the rod backward, and compressed air is supplied from a not-illustrated inlet/outlet port to each of the pneumatic chambers 71a and 71b. By supplying the compressed air to the pneumatic chamber 71a, the moving block 13 is moved forward from a moving-backward limit position illustrated in FIG. 17 toward a moving-forward limit position. On the other hand, by supplying the compressed air to the pneumatic chamber 71b, the moving block 13 is moved backward from the moving-forward limit position toward the moving-backward limit position.

As described above, the moving block 13 is driven to be reciprocated by the drive rod 14 between the moving-backward limit position illustrated in FIG. 1 and the moving-forward limit position illustrated in FIG. 2. In this reciprocation, the moving block 13 is supported via the balls 26 circulating between the guide rail 12 and the moving block 13, and therefore, can be smoothly reciprocated.

The balls 26 are circulated through the ball rolling paths 24a and 24b and the ball circulation holes 25a and 25b provided on the base end side of the moving block 13, and therefore, the moving block 13 can be moved to a position at which the moving block 13 is protruded from the distal end of the guide rail 12. On the other hand, when a slit for connecting a drive member such as a slider with the moving block 13 is conventionally provided to the support base 11, a height of the linear-reciprocating device 10 increases. However, since the moving block 13 is driven by the drive rod 14 protruded from the distal end surface of the support base 11 as illustrated, a small linear-reciprocating device 10 having a small height can be provided even when the moving block 13 is driven by the driving source provided to the support base 11.

If the guide rail 12 is attached to the support base 11 so that the support base 11 and the guide rail 12 are member separately formed from each other, and if the driving source is provided inside the support base 11, a large height of the linear-reciprocating device including the support base 11 and the guide rail 12 cannot be avoided. On the other hand, if the support base 11 and the guide rail 12 are integrally formed with each other so that the guide rail 12 is inserted into the guide groove 22 formed on the inner surface of the moving block 13 and so that the moving block 13 is attached to the guide rails 12 to straddle between the guide rails 12, the driving source can be embedded even inside the guide rail 12, which results in the small height of the linear-reciprocating device. In this manner, the linear-reciprocating device 10 can be downsized.

The present invention is not limited to the above-described embodiment and various modifications can be made within the scope of the present invention. For example, in the above-described linear-reciprocating device 10, the moving block 13 is driven by the driving source provided inside the support base 11. However, other aspect that the moving block 13 is driven by the driving source arranged outside the support base 11 may be adopted.

INDUSTRIAL APPLICABILITY

This linear-reciprocating device is applied to move an object to be transported such as a workpiece or a jig and a tool.

What is claimed is:

1. A linear-reciprocating device for linearly reciprocating a moving block attached so as to freely reciprocate to a guide rail provided to a support base, comprising:
    a first ball rolling groove formed on a side surface of the guide rail so as to face a side surface of a guide groove which is formed on an inner surface of the moving block and into which the guide rail is inserted;
    a second ball rolling groove formed on a base end side of the guide groove and forming a ball rolling path together with the first ball rolling groove;
    a plurality of balls housed in the ball rolling path and in a ball circulation hole formed along the ball rolling path;
    a return lid member provided to a base end of the moving block to form a base-end-side ball return path for communication between the ball rolling path and the ball circulation hole;
    and a return block provided to a longitudinal-directional middle area of the moving block to form a middle-side ball return path for communication between the ball rolling path and the ball circulation hole,
    wherein the moving block is guided by the balls to a position at which a distal end of the moving block is protruded from a distal end of the guide rail,
    wherein an abutment surface on which the return block is abutted is formed in a longitudinal-directional middle area of an inner surface of the moving block.

2. The linear-reciprocating device according to claim 1, wherein an attachment concave portion to which the return block is attached is formed in a longitudinal-directional middle area of an inner surface of the moving block.

3. The linear-reciprocating device according to claim 1, wherein the first ball rolling groove is provided to both sides of the guide rail, and the second ball rolling groove is provided to both side surfaces of the guide groove of the moving block.

4. The linear-reciprocating device according to claim 3, wherein the two return lid members provided to both sides of the moving block are integrally formed with each other by a first connecting portion.

5. The linear-reciprocating device according to claim 3, wherein the two return blocks provided to both sides of the moving block are integrally formed with each other by a second connecting portion.

6. The linear-reciprocating device according to claim 1, wherein the ball circulation hole is formed at a horizontal plane along a surface of the guide rail in parallel with the ball rolling path.

7. The linear-reciprocating device according to claim 1, wherein a guide fit hole formed with a first return groove is provided on each of the return lid member and the return block, and a second return groove for forming the ball return path together with the first return groove is provided to a return guide fitted into the guide fit hole.

8. The linear-reciprocating device according to claim 7, wherein the return guides attached to the return lid member and the return block are formed in the same shape as each other.

9. The linear-reciprocating device according to claim 1, wherein a drive rod provided to the support base is connected to a distal end of the moving block, and the moving block is reciprocated by the drive rod protruded from a distal end surface of the support base.

* * * * *